US006775362B1

(12) United States Patent
Ransom

(10) Patent No.: US 6,775,362 B1
(45) Date of Patent: Aug. 10, 2004

(54) GRAPHICAL TELEPHONE SYSTEM

(75) Inventor: Maurice N. Ransom, Rolesville, NC (US)

(73) Assignee: Alcatel, Paris (FR)

( * ) Notice: Subject to any disclaimer, the term of this patent is extended or adjusted under 35 U.S.C. 154(b) by 78 days.

(21) Appl. No.: 10/092,075

(22) Filed: Mar. 6, 2002

(51) Int. Cl.[7] .................................................. H04M 11/00
(52) U.S. Cl. ............................... 379/93.17; 379/90.01; 370/352
(58) Field of Search ....................... 379/90.01, 93.17, 379/93.23, 93.25, 93.01, 93.08; 370/352

(56) References Cited

U.S. PATENT DOCUMENTS

2002/0062396 A1 * 5/2002 Kakei et al. ................ 709/246
2002/0126654 A1 * 9/2002 Preston et al. .............. 370/352
2003/0026247 A1 * 2/2003 Bernstein .................... 370/352

OTHER PUBLICATIONS

Handley, et al.; SIP: Session Initiation Protocol; IETF RFC 2543; Mar. 1999.

* cited by examiner

Primary Examiner—Stella Woo
(74) Attorney, Agent, or Firm—Anderson, Levine & Lintel; Jessica W. Smith; V. Lawrence Sewell

(57) ABSTRACT

A telecommunications network (30) includes a plurality of devices that communicate using a certain protocol, such as SIP. Packet phones (32) communicate with the network devices using GPSs (34). The GPSs (34) provide a GUI (graphical user interface) for the packet phones (32). As the user operates the GUI to perform functions, event data is sent to the GPS (34) associated with the phone. The GPS (34) interprets the event data and generates SIP (or other protocol) commands to create, modify and terminate communication sessions as desired by the user.

31 Claims, 2 Drawing Sheets

GRAPHICAL TELEPHONE SYSTEM

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to communications and, more particularly, to a digital communication system.

2. Description of the Related Art

Over the last two decades, communications capabilities have increased dramatically. Current communication networks are now capable of providing sophisticated features such as multiple party conferencing with multiple private sidebar conversations, programmable "follow-me" calling, and sophisticated voice mail options.

Unfortunately, the main interface to a communication network, the 12-key telephone pad, has not changed. As a result, many available features are seldom used, because accessing the features by key sequences is non-intuitive and error-prone. In some cases, features can be provisioned by a user through a computer interface apart from the telephone. For example, follow-me calling allows a user to have a single telephone number which is used to access a number of communication devices associated with the user, such as a home telephone number, a work telephone number, a mobile telephone and voice mail, in a specified sequence. The user can define the sequence in which the communication devices are accessed in relation to certain criteria, such as date and time. For example, a user may define a work day sequence where his or her work number is accessed first, a secretarial phone accessed second, a mobile phone accessed third and voice mail accessed fourth; the weekend sequence may be home phone first, mobile phone second and voice mail third. The desired sequence is stored in a database of a network provider. To ease the burden of user programming, some providers have allowed the database to be modified by users through a Web page over an Internet connection. However, use of a separate computer connection is often inconvenient, and Internet provisioning of services can reasonably be used only for certain types of features that do not change often.

Recently, SIP (Session Initiation Protocol) was developed to assist in providing advanced telephony services using VOIP (Voice over Internet Protocol) over a digital communication network (which could include the Internet or other global data network). Using a telephone with a graphical interface, a user can easily create, modify and terminate multiple telecommunications sessions with one or more participants by manipulating objects on the telephone screen.

A downside to a SIP telephone is that there is no standard graphical user interface (GUI); each SIP telephone manufacturer is free to design its own GUI. Accordingly, a user is likely to become accustomed to a single interface and will face difficulties using telephones with a different interface. Since a single home or office may use telephones from multiple manufacturers, the advantages of using a SIP phone for simplified access to advanced features are greatly diminished.

Therefore, a need has arisen for a method and apparatus for providing a consistent user interface to telephones from multiple manufacturers.

BRIEF SUMMARY OF THE INVENTION

In the present invention, a communications system comprises a digital network and a plurality of devices coupled to a network for enabling communications sessions responsive to commands conforming to a known protocol. A plurality of telephones are coupled to the network for communicating by sending and receiving packetized data over the network during the communications sessions. One or more graphical proxy servers are coupled to a plurality of the telephones for providing a graphical interface to the telephones, receiving control information associated with actions by users using the graphical interface, and generating commands conforming to the known protocol in response to the control information.

The present invention provides significant advantages over the prior art. First, since the network provider controls the graphical proxy servers on its network, a consistent interface can be provided to all users on the network, regardless of the brand of telephone used. As features and capabilities are added, the graphical interface of the telephone can be easily upgraded to include those features.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1–4 of the drawings, like numerals being used for like elements of the various drawings.

Figure 1:
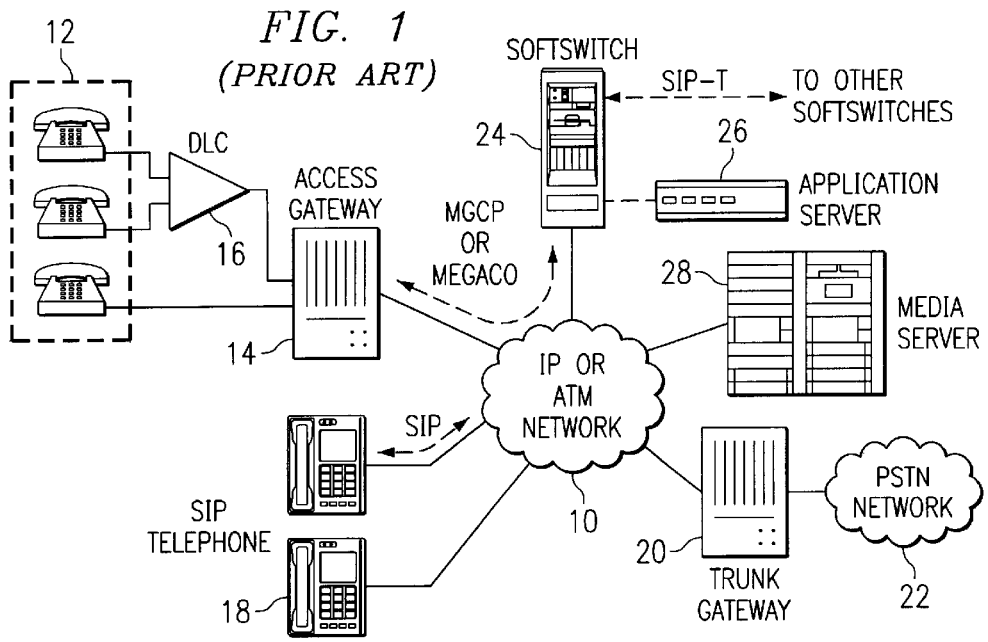
FIG. 1 illustrates a block diagram of a presently envisioned communications network using VOIP.

FIG. 1 illustrates a current vision for the implementation of a packet-based Next Generation Network (NGN). A packet-based network 10 is the main carrier of telecommunications traffic. The network 10 could use, for example, IP (Internet Protocol) or ATM (Asynchronous Transfer Mode). Legacy telephone equipment 12 (i.e., present-day telephones and similar equipment compatible with the public switched telephone network) is coupled to the network 10 via access gateways 14, either directly or through digital loop carriers 16. The access gateways 14 interface between the analog legacy telephone equipment and the network 10, using a protocol such as MGCP (Media Gateway Control Protocol) or MEGACO (H.248).

SIP telephones 18 can be connected directly to the network 10. SIP telephones are intelligent devices that contain processors that are independent from a central switching location (i.e., a central office) and have one or more processors to create, modify and terminate communication sessions.

A trunk gateway 20 provides an interface between the packet network 10 and the PSTN (public switched telephone network) 22.

Softswitches 24, application servers 26 and media servers 28 are instrumental in providing advanced functions. A softswitch is a software-based entity that provides call control functionality. A softswitch may support multiple packet-based protocols, such as SIP, MGCP, MEGACO and multiple telephony and data protocols, such as CAS, INAP, ISDN, SS7, TCAP, TCP/IP. A softswitch 24 may interface with the PSTN 22 through various gateways.

In a SIP environment, a softswitch 24 may act as a SIP proxy server for name resolution and user location—similar to domain server. In this way, a name (similar to a domain name) can be dynamically associated with a current IP address. Also, a SIP proxy server may be used for redirection of packets, where the proxy server "pretends" to the other network elements that it is the user's SIP terminal and forwards messages to the real SIP terminal (or conceivably to another SIP Proxy).

Application servers 26 provide services that may result in termination of a call, such as voice mail, conference bridging, pre-paid calling, or delivering services and information to an end user. An application server can be coupled to other data networks, such as the Internet, to gain access to information systems.

Media servers 26 provide media processing under control of a media gateway controller (not shown). The media server 26 could provide, for example, voice storage and responses for voice mail, or video streams.

In operation, SIP telephones 18 provide services by communicating over network 10 using the SIP protocol. The SIP protocol is designed to be flexible in order to accommodate any type of voice or data communication. For example, conference calling can be supported using multicast or a mesh of unicast relations, or a combination of both. A party to a conference call, could, for example, have a sidebar private communication with one of the parties to the conference and an instant messaging (text) communication with another party. Communications may have voice and/or video components.

The SIP protocol is based around using smart terminals (SIP phones 18) and a "dumb" network. Hence, the network 10 passes data as directed by the phones, allowing flexibility in the types of communications between SIP devices. Each SIP phone has flexibility in determining the manner in which communication sessions are created, modified and terminated. For example, some manufacturers may provide SIP telephones with a large number of buttons to control common session types, while others may rely on a more graphical interface with a touch sensitive screen. In particular, the actions taken by the user to initiate a communications session could vary between phone types. For example, one SIP phone could create a sidebar conversation by dragging a graphical representation of one of the parties to a separate "room" shown on the SIP phones screen. Another SIP phone could create a sidebar conversation by clicking on a party and selecting "sidebar" from a drop-down box. The variations on how sessions are initiated (or modified and terminated) are almost endless. Hence, SIP phones may easily fail in their quest to be user-friendly.

Figure 2:
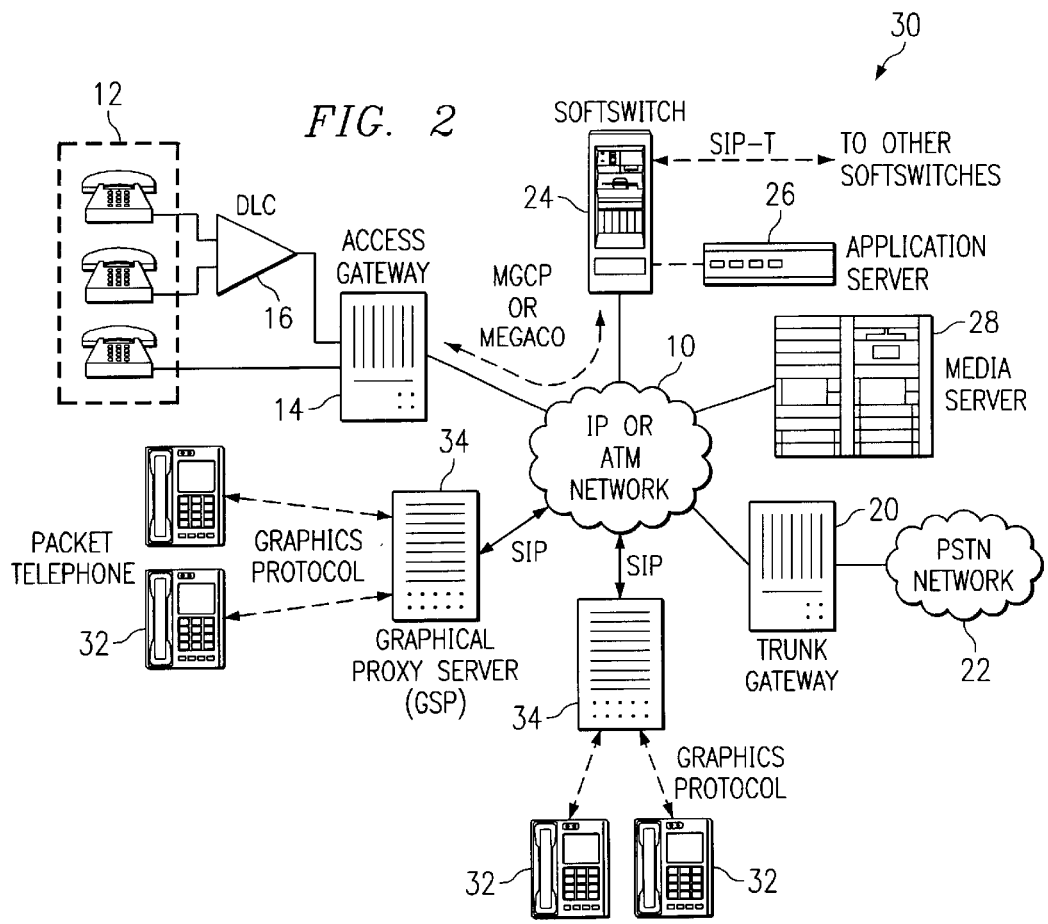
FIG. 2 illustrates a block diagram of a communications network using the present invention.

FIG. 2 illustrates a preferred embodiment of the present invention, where the user interface of phone can be controlled via the network provider, thereby allowing the network provider to establish GUIs with consistent operation across the network.

As shown in FIG. 2, the system 30 is similar to the system of FIG. 1, with the exception that "packet" phones 32 and Graphical Proxy Servers (GPSs) 34 are used in place of SIP phones 18. The packet phones 32 communicate with an associated GPS 34 over the network 10 using a graphics protocol that provides control information regarding a user's actions with the packet phone's GUI. The GPS communicates with other devices over the network using SIP.

In operation, each packet phone 32 is associated with a GPS 34 at a predetermined network address. Typically, a network will have multiple GPSs 34, with each GPS 34 servicing a subset of the packet phones 32. For the shortest latency, the GPSs 34 should be located proximate the associated packet phones 32, although proximity is not strictly required. When a packet phone 32 is first connected to the network 10 its associated GPS 34 determines the capabilities of the packet phone 32, such as display size and color depth, memory size, processor speed, input devices and so on. Based on the packet phone's capability, a graphical user interface program is downloaded to the packet phone 32. The operation of the graphical user interface may vary upon the capabilities of the particular packet phone 32. For example, a packet phone 32 with a large color screen suitable for a home or office may use larger, more detailed icons than a mobile packet phone. Alternatively, a single GUI program could be downloaded to the packet phone 32, and the GUI program could configure itself upon execution.

The graphical user interface may be provided using a processor independent language, such as a variant of HTML (HyperText Markup Language) and/or JAVA. With a processor independent language, a "virtual machine" is used to interpret a common set of instructions into the native language of the processor used in the device.

The GPS may be configured similar to a web server (or a bank of web servers), with processing capabilities to translate received user actions into commands for transmission to other network devices using SIP (or another desired protocol).

Figure 3:
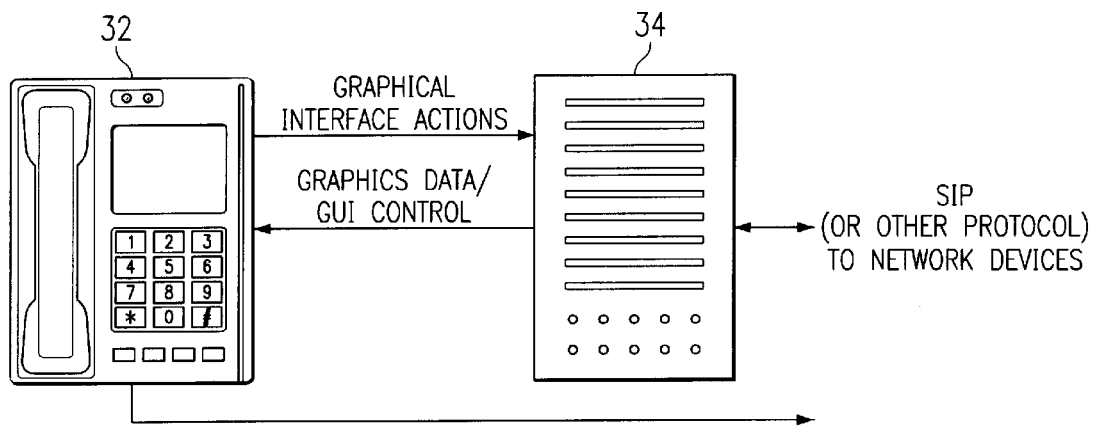
FIG. 3 illustrates communications between a packet phone and a graphical SIP proxy server.

As shown in FIG. 3, when the user performs specific operations on the packet telephone 32, such as by clicking on a graphical object (or pressing an object using a touch screen), moving an object graphic, dropping an object onto another object, or pressing a key, control information about the action taken by the user (the "event") is sent to the GPS 34 using a graphics protocol. Depending upon the event information sent to the GPS, the GPS 34 may send graphics data or GUI control information to the packet telephone 32 and it may send SIP commands to other devices on the network 10 to create, modify or terminate a session. Also, as shown in FIG. 3, it is not necessary for the GPS 34 to receive session data from the packet phone 32, such as voice or video packets; the GPS need only receive data from operation of the packet telephones graphical interface.

From the standpoint of the other devices on the network 10, the SIP commands are received from the GPS 34 in the same way the commands would be received from a SIP telephone 18. The operation of the invention is thus transparent to devices on the network. Thus, the GPS 34 could be used on the network 10 along with SIP telephones 18 communicate SIP commands directly, rather than via the GPS 34.

It should be noted that some actions by the user might result in changes in the flow of the GUI program without sending event information to the GPS 34. Fore example, the user could take an action using the GUI indicating the desire to create a conference call. This action could result in a new screen with conference call options, without sending information to the GPS 34. Similarly, the GPS 34 does not necessarily output a SIP command for each piece of event information received from a packet telephone 32. The GPS 34 may wait for additional event information, or it may download additional programs and/or graphics to the packet telephone 32, or it may send control information to control the flow of the GUI.

Figure 4:
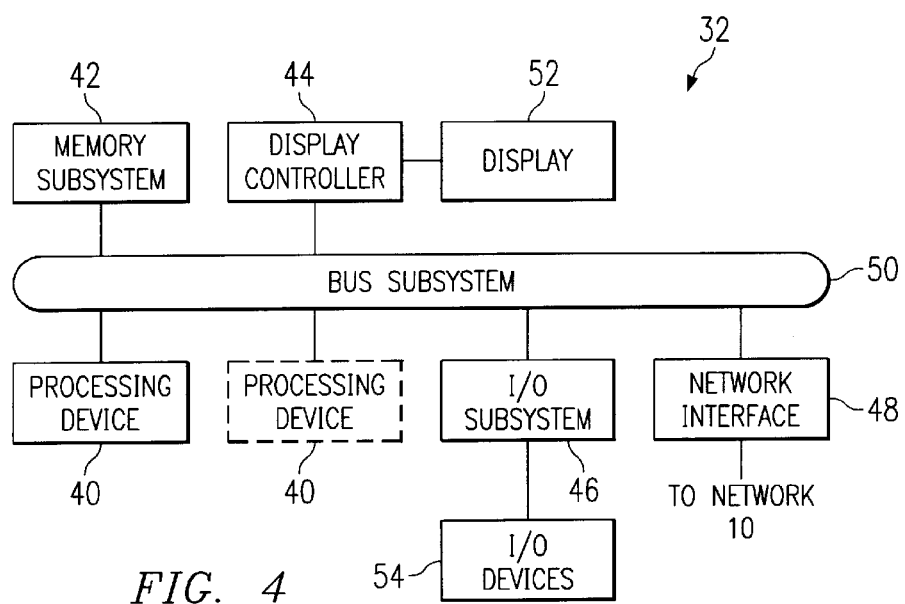
FIG. 4 illustrates a block diagram of a packet phone.

FIG. 4 illustrates a basic block diagram of a possible implementation for the packet phone 32. One or more processing devices 40 are coupled to a memory subsystem 42, display controller 44, I/O subsystem 46 and network interface 48 via a bus subsystem 50. Display controller 44 controls display 52. I/O subsystem 46 passes data between the processing devices 40 and memory subsystem 42 and I/O devices 54. Network interface 48 is coupled to network 10.

The processing devices 40 may include general-purpose processors, digital signal processors (DSPs) and coprocessors. The memory subsystem can include volatile memories, such as dynamic and static rams, and non-volatile memories, such as flash memories. I/O devices 54 could include input devices such as keys, track balls, mice, and touch screens, as well as a microphone and speaker for conversing. The I/O subsystem 46 could also provide ports for content, such as USB (universal serial bus) and IEEE 1394 ports to receive data, video and graphics from a variety of sources, such as digital still and video cameras, computers, hard drives and other memory devices. The display 52 could use one of many technologies, such as cathode ray tube, LCD (liquid crystal display), or OLED (organic light emitting diodes).

In operation, the packet phone will be initially programmed with the address of its GPS 34. Also, the packet phone will have certain base programs necessary to allow access to the GPS and hardware-related programs, such as the JVM (JAVA Virtual Machine). When the packet phone 32 is connected to the network 10, it automatically accesses the GPS 34. At this point, the GPS 34 determines the capabilities of the packet phone 32 and downloads GUI code appropriate for the particular packet phone 32.

Several options exist for downloading GUI code to the packet phone 32. In one embodiment, the packet phone 32 acts similar to an Internet web browser, with the GPS 34 designated as the home page. In this embodiment, the operational code for the GUI is stored at the GPS 34, where the packet phone 32 accesses the code during use. Certain objects, such as graphics and JAVA (or similar language) code may be cached in the memory subsystem 42. This embodiment works best for packet phones 32 that access the network over a high-speed connection, since there is a relatively large amount of GUI data passed back and forth between the packet phone 32 and the GPS 34.

In a second embodiment, a larger portion of the GUI code is stored in the memory subsystem 42 of the packet phone 32. In this embodiment, the operation of the packet phone 32 can proceed with less data transfer between the packet phone 32 and GPS 34 during use. This embodiment is better suited to mobile devices, with lower connection speeds and more stringent power consumption requirements. For a mobile device, a non-volatile memory for storing the GUI code is preferred, since power may be lost frequently. This embodiment may also be used with other phones, in order to supply the most responsive GUI.

The portion of the GUI code stored in the packet phone 32 is thus a design decision to be made by each network provider. Several variations may be available to accommodate different phone types.

It should be noted the while the GPS 34 is described as communicating with other network devices using SIP, the GPS 34 could communicate in any protocol, such as MGCP or MEGACO, or in multiple protocols. The GPS could be reprogrammed at any time to communicate to network devices using a different protocol. Since the packet phone 32 is unaware of the protocol being used, protocols can be changed at the GPS 34 as technology progresses, without need for phone upgrades.

The present invention provides significant advantages over the prior art. First, since the network provider controls the GPSs 34, a consistent interface can be provided to all users on the network, regardless of the brand of packet phone used. As features and capabilities are added, the GUI of the packet phone 32 can be easily upgraded by the GPS to include those features.

Although the Detailed Description of the invention has been directed to certain exemplary embodiments, various modifications of these embodiments, as well as alternative embodiments, will be suggested to those skilled in the art. It should be noted that the network diagrams provided herein are simplified for ease of illustration; an actual network would provide many more devices and could support many different types of devices as technology advances. The invention encompasses any modifications or alternative embodiments that fall within the scope of the Claims.

I claim:

1. A communications system comprising:
 a digital network;
 a plurality of devices coupled to said network for enabling communications sessions responsive to commands conforming to a known protocol;
 a plurality of telephones coupled to said network for communicating by sending and receiving packetized data over said network during said communications sessions; and
 one or more graphical proxy servers coupled to a plurality of said telephones for:
  providing a graphical interface to said telephones;
  receiving control information associated with actions by users using said graphical interface; and
  generating commands conforming to said known protocol in response to said control information.

2. The communications system of claim 1 wherein said digital network is an IP network.

3. The communications system of claim 1 wherein said digital network is an ATM network.

4. The communications system of claim 1 wherein said plurality of devices include one or more softswitches.

5. The communications system of claim 1 wherein said plurality of devices include one or more applications servers.

6. The communications system of claim 1 wherein said plurality of devices include one or more media servers.

7. The communications system of claim 1 wherein said control information is generated using a graphics protocol.

8. The communications system of claim 1 wherein said known protocol comprises SIP.

9. The communications system of claim 1 wherein said known protocol comprises MEGACO.

10. The communications system of claim 1, wherein said telephones comprise:
 one or more processors;
 a memory subsystem;
 a graphical display.

11. A method of communicating over a digital network coupling a plurality devices coupled to said network for enabling communications sessions responsive to commands conforming to a known protocol, comprising the steps of:

downloading a graphical interface to a plurality of telephones from a graphical proxy server;

uploading control information associated with actions by users using said graphical interface from said telephones to said graphical proxy server;

generating commands conforming to said known protocol in response to said control information; and sending and receiving data between the telephones responsive to said commands.

12. The method of claim 11 wherein said sending and receiving step comprises the step of sending and receiving packetized data between the telephones.

13. The method of claim 11 and further comprising the step of transmitting said commands to one or more of said devices.

14. The method of claim 13 wherein said transmitting step comprises the step of transmitting said commands to a softswitch.

15. The method of claim 13 wherein said transmitting step comprises the step of transmitting said commands to an applications server.

16. The method of claim 13 wherein said transmitting step comprises the step of transmitting said commands to a media server.

17. The method of claim 11 wherein said uploading step comprises the step of uploading control information using a graphics protocol.

18. The method of claim 11 wherein said step of generating commands comprises the step of generating commands using a SIP protocol.

19. The method of claim 11 wherein said step of generating commands comprises the step of generating commands using a MEGACO protocol.

20. The method of claim 11 wherein said step of generating commands comprises the step of generating commands using a MGCP protocol.

21. A telephone comprising:

circuitry to receive graphical interface information over a network from a graphical proxy server; and circuitry to send control information indicative of actions taken by a user with said graphical interface over said network to said graphical proxy server for translation to a known protocol.

22. The telephone of claim 21 wherein said control information is generated using a graphics protocol.

23. The telephone of claim 21 and further comprising a memory subsystem for storing said graphical interface.

24. The telephone of claim 23 wherein a portion of said memory subsystem comprises a non-volatile memory.

25. The telephone of claim 21 and further comprising a graphical display.

26. A graphics proxy server comprising:

circuitry to transmit graphical interface information over a network to a telephone; and circuitry to receive control information indicative of actions taken by a user with said graphical interface over said network from said telephone; and circuitry for generating commands in a known protocol responsive to said control information.

27. The graphics proxy server of claim 26 wherein said known protocol is SIP.

28. The graphics proxy server of claim 26 wherein said known protocol is MEGACO.

29. The graphics proxy server of claim 26 wherein said known protocol is MGCP.

30. A graphical proxy server for controlling a graphical user interface of a user device, comprising:

means for downloading a graphical user interface to the user device;

a means for receiving control information indicative of actions taken by a user with said graphical user interface from said user device;

a means for transmitting updated graphical data to the user device responsive to said control information; and a means for generating commands in a known protocol responsive to said control information and transmitting the commands to a proxy server to control a communication session with the user device.

31. The graphical proxy server of claim 30, wherein graphical proxy server determines a graphical user interface program to download in response to the capabilities of the user device.

* * * * *